United States Patent [19]

Sloan

[11] 4,176,066
[45] Nov. 27, 1979

[54] GRAVITATIONAL FLOW SEPARATOR OF THE MULTIPLE, APERTURED TUBE TYPE FOR SEPARATING WATER FROM SAND, GRAVEL OR THE LIKE

[76] Inventor: Albert H. Sloan, 4201 Kean Rd., Fort Lauderdale, Fla. 33314

[21] Appl. No.: 922,038

[22] Filed: Jul. 5, 1978

[51] Int. Cl.$^2$ ............................................. B01D 23/06
[52] U.S. Cl. .................................... 210/241; 209/421; 210/323 T
[58] Field of Search ................ 137/344, 351; 209/421, 209/305, 306; 210/236, 241, 322, 251, 298, 323 T, 334, 407, 409, 465, 473, 532 R, 533, 534, 535, 538, 540

[56] References Cited

U.S. PATENT DOCUMENTS

| | | | |
|---|---|---|---|
| 2,765,084 | 10/1964 | Tursky | 210/323 T |
| 3,363,761 | 1/1968 | Groth et al. | 210/241 |
| 3,794,164 | 2/1974 | Ginaven | 209/305 |

Primary Examiner—Frank Sever
Attorney, Agent, or Firm—James E. Nilles

[57] ABSTRACT

A dewatering separator device for separating solid particles such as sand, gravel, or the like from a liquid, such as water, and thereby preconditioning the water either for further filtering elsewhere or for permitting the water to be accepted in storm drains. The separator device is of the gravitational flow type and includes a plurality of vertically arranged tubes, each of which has small apertures in the form of thin slits in their side wall. The mixture of solid material, i.e., sand, gravel, and the like, and water is dumped through the top of the tubes, causing the heavier solid material to pass through the tubes where it is collected in a constituent trap, and from which the material is periodically discharged at one location. The water passes through the small slits in the sidewalls of the tubes and is discharged from the separator device separately from the solid material. The device has a movable support to render it portable for transport to different job sites.

19 Claims, 10 Drawing Figures

GRAVITATIONAL FLOW SEPARATOR OF THE MULTIPLE, APERTURED TUBE TYPE FOR SEPARATING WATER FROM SAND, GRAVEL OR THE LIKE

BACKGROUND OF THE INVENTION

The invention pertains to separating devices for separating a mixture of sand and gravel from water for example, when such a mixture is pumped from excavating areas prior to construction of a building in the area. Before such a mixture can be dumped into storm sewers, it must be preconditioned, that is to say the great majority of the solid particles, such as sand and gravel must be removed from the water before it can be conducted to the storm drains. This presents a problem due to the large volume of such a mixture that is pumped from the excavated areas and which must be disposed of in a rapid manner. Such separating devices find particular utility when used in dewatering pump apparatus, such as shown in my U.S. Pat. No. 3,910,728, where such apparatus is used to pump a large volume of water and so-called trash from excavated areas and the mixture is conveyed elsewhere through a large conduit. If such water discharge is to be run into a storm drain, it must first be preconditioned as above noted.

Various separating devices have been attempted to be used, but have generally employed filter media which are subject to fouling and require frequent replacing. Other devices are incapable of handling a large volume of trash mixture, and/or are more or less permanent installations which are difficult to move from one pumping site to another.

SUMMARY OF THE PRESENT INVENTION

The present invention provides a separating device for separating solid trash such as sand, gravel, or other foreign material from water by means of dumping the mixture over a plurality of vertically arranged members, such as pipes, the pipes having a series of five apertures such as thin slits therein through which the water passes on its downward descent. The arrangement is such that the outlet for the solids is closed and the device is substantially filled with the mixture of sand, gravel, other foreign material and water. As the water passes through the apertures in the pipes, the solid material settles downwardly through the vertical pipes and is collected in a lower tapered portion of the device. Infrequently, after sufficient sand and gravel has settled out to substantially fill the bottom section of the housing, the solids outlet gate is opened, thus cleaning the solids out of the housing. The clean water discharges through separate openings after it has passed through the apertures in the pipes. Thus, the outlet from the device for the sand and gravel is located at the lower end of a tapered or inclined bottom, while the water is taken from the device adjacent the lower ends of the vertical tubes.

A portion of the water can be conducted through separate smaller pipes to the area of the discharge gate of the solid material and this water acts to free or flush the solid material out the gate.

The apertures in the pipes can be formed as either horizontally or vertically disposed in vertical rows at circumferentially spaced locations around each pipe. The slits are on the order of 0.02 of an inch wide which permits the rapid passing of water therethrough and at the same time preconditions the water by removing substantially all of the solid material and at a rapid rate.

The entire device is mounted as a portable unit for easy and quick transfer from one pumping site to another.

These and other objects and advantages of the present invention will appear hereinafter as this disclosure progresses, reference being had to the accompanying drawings.

DESCRIPTION OF THE INVENTION

Figure 1:
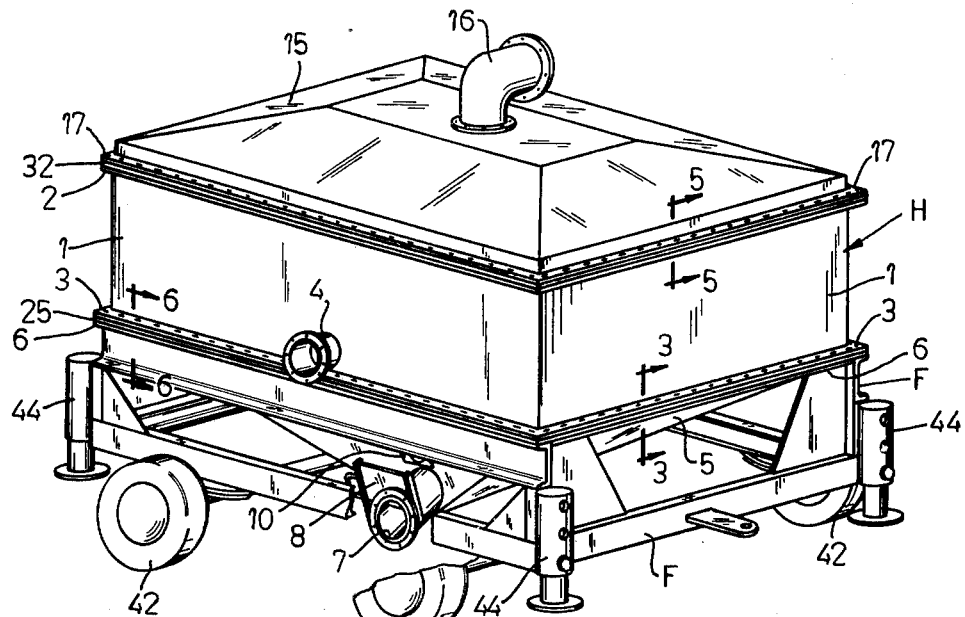
FIG. 1 is a perspective view of a separator device made in accordance with the present invention, certain parts being shown as broken away for the sake of clarity.
Figure 3:
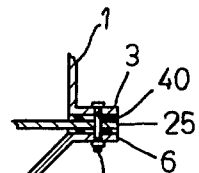
FIG. 3 is an enlarged, fragmentary, sectional view taken generally along the line 3—3 in FIG. 2.
Figure 2:
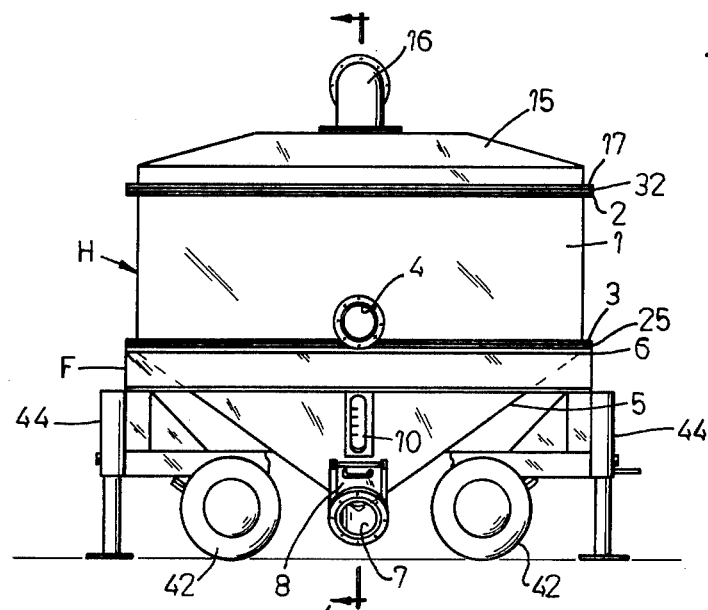
FIG. 2 is a side elevational view of the device shown in FIG. 1, certain parts shown as broken away for the sake of clarity in the drawing.

The dewatering device includes an enclosing housing H having a generally rectangular section 1 having vertical side walls and also having an outwardly turned flange 2 around its upper periphery and another outwardly extending flange 3 around its lower periphery. The housing also includes a downwardly and convergingly tapering bottom section 5 which has a peripheral flange 6 extending outwardly at its upper end. The tapering bottom section has a solid mixture outlet 7 which is closeable by a generally vertical slideable gate 8. A glass sight 10 is provided in one tapered wall of the bottom section for viewing the solid mixture therein. The housing furthermore includes an upper section or upper cover 15 having a mixture inlet pipe 16 and also having an outwardly extending flange 17 extending around its periphery. Water outlets 4 are provided at opposite sides of the central section 1 and are located at the bottom of this central housing section 1 for discharging "clean" water therefrom.

Figures 7, 8, 9:
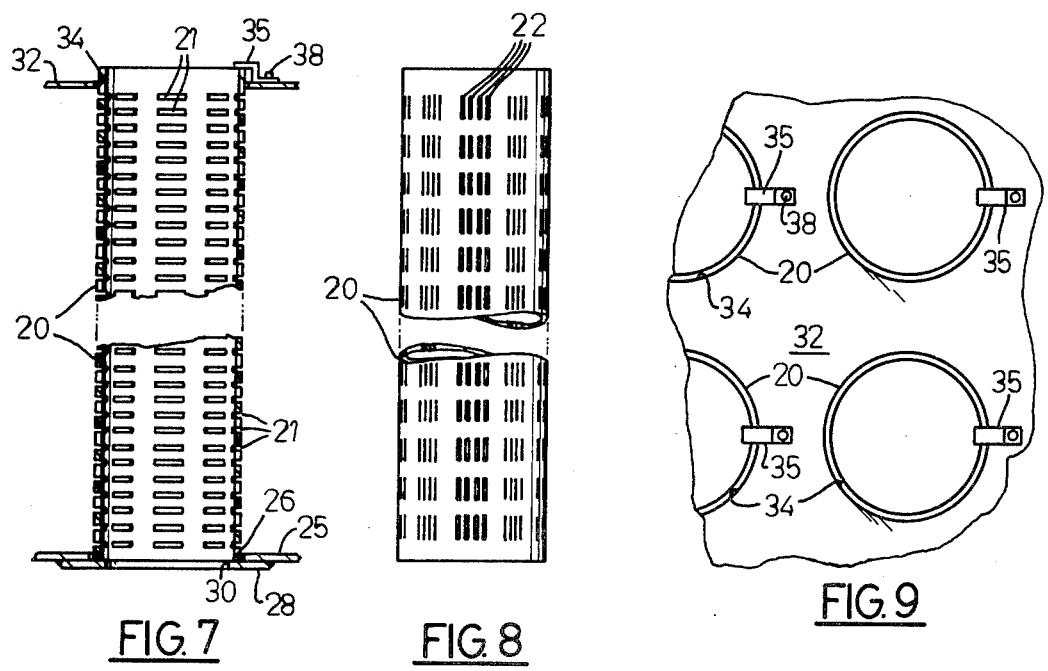
FIG. 7 is an elevational view, in section, of one form of vertical pipes in the separating device.
FIG. 8 shows a modified form of pipe.
FIG. 9 is a fragmentary view taken generally along the line 9—9 in FIG. 4, but on an enlarged scale.
Figure 10:
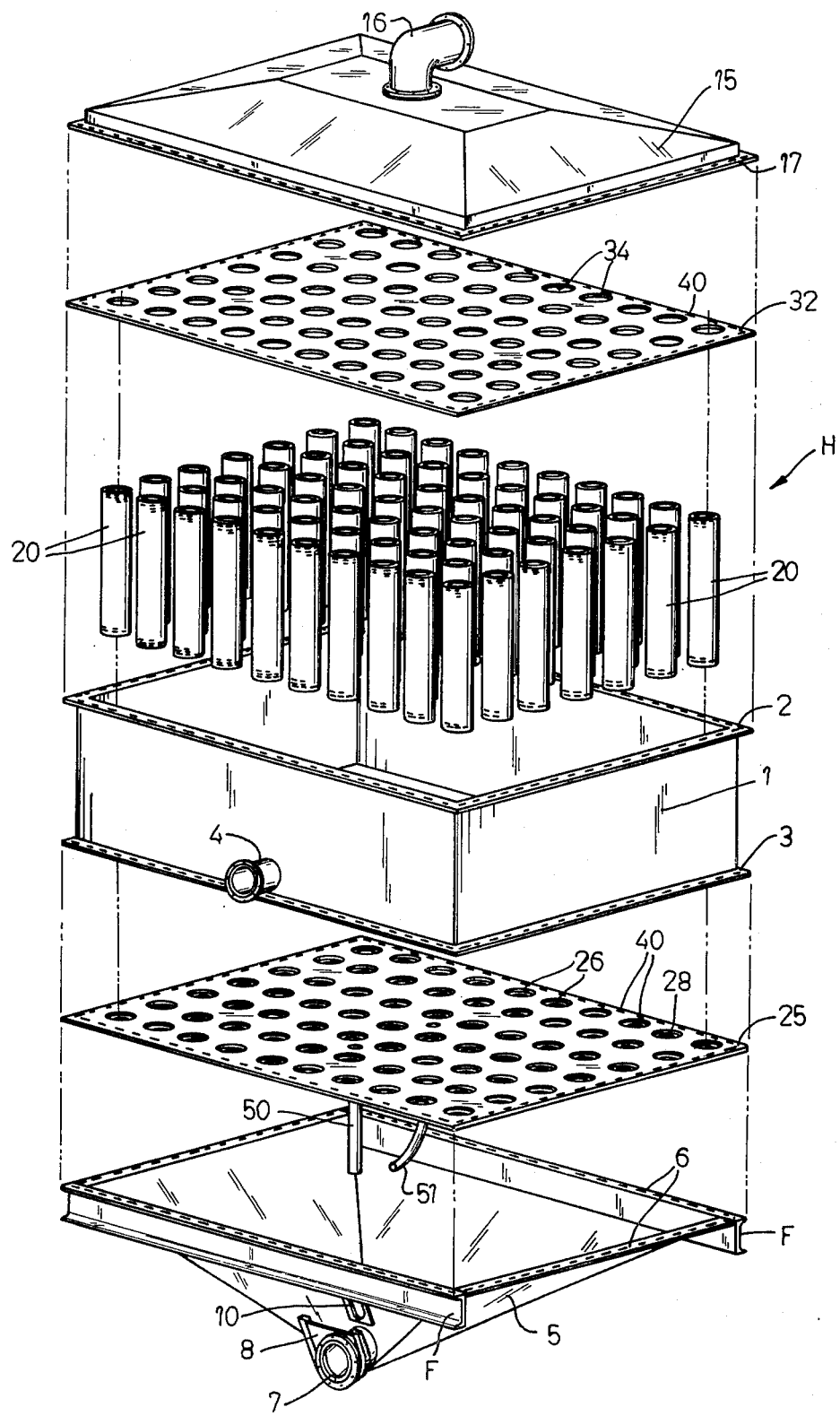
FIG. 10 is an exploded, perspective view of the device as shown in FIG. 1, certain parts being omitted or removed for the sake of clarity.

The dewatering device includes a plurality of vertically arranged tubular members 20 each of which has a series of small apertures extending through their walls and these apertures can take the form of either horizontally disposed slits 21 (FIG. 7) or vertically disposed slits 22 (FIG. 8). These slits are on the order of 0.20 inches in width which is of a size sufficient to permit the rapid passing of water therethrough, but at the same time substantially remove all of the solid material at a rapid rate. These slits are formed in the pipe by sawing, the pipe itself preferably being made from plastic commonly referred to as PVC material.

A lower, generally horizontal floor 25 has a series of apertures 26 therein and further has (FIG. 7) a series of rings 28 welded to the underside of the floor 25 and around the holes 26 in the floor. Thus, a lip 30 is formed beneath the holes 26 in the floor 25 so that the lower end of the pipes can set on the lip 30 and be held in place at their lower end. In this manner means are provided on the horizontal floor into which the pipe can be removably set in position and which permits the solid material to pass downwardly through the pipes and through the horizontal floor.

Another generally horizontal wall 32 is located at the upper end of the pipes and this horizontal wall 32 also has a series of apertures 34 therein and through which the upper ends of the pipes pass. Brackets 35 (FIG. 7) are removably fixed as by cap bolts 38 to the horizontal wall 32 and extend over the upper end of the pipes to securely hold them downwardly in place.

Figures 4, 5, 6:
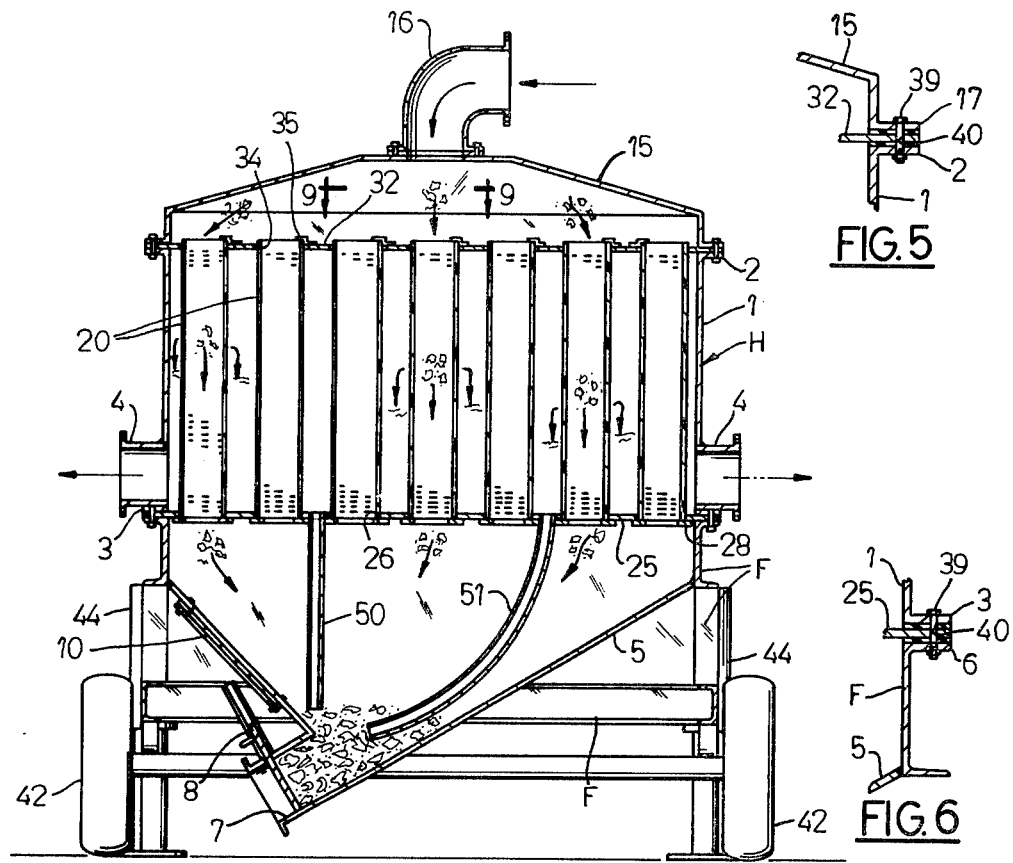
FIG. 4 is a vertical elevational view in section of the device shown in FIGS. 1 and 2, the view being taken generally along the line 4—4 in FIG. 2.
FIGS. 5 and 6 are fragmentary, enlarged sectional views taken generally along the lines 5—5 and 6—6, respectively, in FIG. 1.

It will be noted that aligned holes 40 extend through the outer edges of the plates 25 and 32, through the flange 17 of the cover, through the flanges 2 and 3 of the central housing section 1 and also through the flange 6 of the lower housing section 5. Suitable gaskets as shown in FIGS. 5 and 6 may be interposed along the floor and suitable bolt means 39 removably secure the housing sections and their horizontal walls together.

The entire separating device is rendered mobile by being mounted on the frame F and which is supported by ground wheels 42. Adjustable stands 44, one at each corner of the frame are provided for absorbing the weight of the separating device when loaded, thus relieving the tires and wheels from this weight.

In operation, the solid mixture gate 8 would be closed and the dewatering device substantially filled through the mixture inlet 16 with sand, gravel, and other foreign material, and water, the material flowing downwardly through the series of vertical pipes, and in doing so, the water passes through the slitted apertures in the pipes and collects between the pipes for passage outwardly through the water outlets 4. As the solid material settles downwardly into the lower tapered section of the housing, substantially all of the water separates by passing through the slitted apertures in the pipes, and when sufficient solid material has thus collected in the bottom section, the gate 8 is opened, permitting the solid material to flow or be flushed out. To facilitate the solid emptying flow, some water is conducted through the pipes 50, 51 to the area of the gate, thereby flushing or breaking up the solid material and ensuring its flow through the open gate 8. It may be necessary to empty the solid material only infrequently, while the clean water is taken out continuously.

In this manner, the water that has been discharged through the slits in the pipe collects adjacent the lower, generally horizontal floor 25 for discharge through the outlets 4 while the solid material passes directly through the vertical pipes for collection in the bottom tapered section and for eventual discharge through the gate 8.

The entire device is mounted on a mobile frame for transport over the ground and can be fully supported by the outrigger stands 44 when the device is being used as a separator.

The dewatering device provided by the present invention can be readily fabricated and assembled and can be furthermore readily disassembled for cleaning, inspection or repair. This is accomplished by means on the horizontal floor 25 which permit the quick assembly and ready removal of the pipes on the floor. Furthermore, the upper horizontal wall 32 can be assembled over the vertical pipes after they have been assembled in the central section 1 of the housing and then the brackets 35 can be easily fastened in place to secure the tubular members in place. The cover 15 can then be finally attached.

I claim:

1. A dewatering device for separating water from sand and gravel or the like, said device including an enclosing housing, a series of generally vertically disposed tubular members in said housing, each of said tubular members having a series of small apertures therein, said housing having a solid and water mixture inlet at the top thereof and in communication with said upper ends of said tubular members and for discharging said mixture thereto, a discharge outlet for said solid material adjacent the bottom of said housing and in communication with said tubular members for receiving solid material therefrom for discharge from said housing, means in said housing and around the lower end of said tubular members for receiving water that has been discharged through said apertures in said tubular members and for conducting said water from said housing, and means to divert a portion of water which has been discharged through said slits to gravity flush solid material through said discharge outlet.

2. The device as set forth in claim 1 further characterized in that said apertures in said members are formed as slits on the order of 0.020 inch widths.

3. The device set forth in claim 1 further characterized in that said housing includes a downwardly and convergingly tapering bottom section located beneath said tubular members and for receiving sand and gravel from said tubular members, said discharge outlet for solid material located adjacent the bottom of said bottom section and a gate valve adjacent a lower part of said tapered section.

4. The device set forth in claim 1 further characterized in that said housing includes an upper cover located above said tubular members and said mixture inlet is located adjacent the top of said cover whereby said mixture is introduced into said cover for flooding over said tubular members.

5. The device as set forth in claim 1 further characterized in that said device is mounted on wheels for transport over the ground.

6. A dewatering device for separating water from sand and gravel or the like, said device including an enclosing housing, said housing including a central section having generally vertical wall means, a series of vertically disposed tubular members in said central section, each of said tubular members having a series of small apertures therein, said housing having a solid and water mixture inlet at the top thereof and in communication with said upper ends of said tubular members and for discharging said mixture thereto, said housing also including a downwardly and convergingly tapering bottom section located beneath said central section and for receiving sand and gravel from said tubular members, a discharge outlet for said solid material adjacent a lower end of said bottom section, means in said housing and located adjacent the lower end of said tubular members for receiving water that has been discharged through said aperture in said tubular members for conducting said water from said housing, and means to divert a portion of water which has been discharged through said apertures to gravity flush solid material through said discharge outlet.

7. The device as set forth in claim 6 further characterized in that said apertures are formed as slits having a width of about 0.02 inches.

8. The device as set forth in claim 6 further characterized in that said device is mounted on wheels for transport over the ground.

9. A dewatering device for separating water from sand and gravel or the like, said device including an enclosing housing, said housing including a central section having generally vertical wall means, a series of vertically disposed tubular members in said central section, a generally horizontal wall located above said central section and having a series of holes therein for the reception of the upper ends of said tubular members, each of said tubular members having a series of small slits therein, said housing having a solid and water mixture inlet at the top thereof and in communication with said upper ends of said tubular members and for discharging said mixture thereto, said housing also including a downwardly and convergingly tapering bottom section located beneath said central section and for receiving sand and gravel from said tubular members, a discharge outlet for said solid material adjacent a lower end of said bottom section and in communication with said tubular members for receiving solid material therefrom for discharge from said housing, means to divert a portion of water which has been discharged through said slits to gravity flush solid material through said discharge outlet, a lower generally horizontal floor in said housing and between said central and bottom housing sections and around the lower end of said tubular members and connecting the latter, said floor receiving water that has been discharged through said slits in said tubular members, and a water outlet in said housing central section for conducting said water from said housing after said water has passed through said slits.

10. The device as set forth in claim 9 further characterized in that said slits in said pipes are horizontally disposed and extend only partially around the circumference of said pipes.

11. The device as set forth in claim 9 further characterized in that said device is mounted on wheels for transport over the ground.

12. A device set forth in claim 9 further characterized in that said horizontal floor has a series of holes therein in which said tubular members are removably mounted, and said horizontal wall includes means for holding said tubular members in said series of holes in said horizontal wall.

13. A dewatering device for separating water from sand and gravel or the like, said device including an enclosing housing, a series of vertically disposed tubular members in said housing and having upper ends connected together by means of an upper generally horizontal wall, each of said tubular members having a series of small slits therein, said housing having a solid and water mixture inlet at the top thereof and in communication with said upper ends of said tubular members and for discharging said mixture thereto, a discharge outlet for said solid material adjacent the bottom of said housing and in communication with said tubular members for receiving solid material therefrom for discharge from said housing, a lower generally horizontal floor in said housing and around the lower end of said tubular members and connecting the latter, said floor receiving water that has been discharged through said slits in said tubular members and a water outlet in said housing for conducting said water from said housing after said water has passed through said slits, and means to divert a portion of water which has been discharged through said slits to gravity flush solid material through said discharge outlet.

14. The device as set forth in claim 13 further characterized in that said slits in said pipes are horizontally disposed and extend only partially around the circumference of said pipes.

15. The device set forth in claim 13 further characterized in that said housing includes a downwardly and convergingly tapering bottom section located beneath said tubular members and for receiving sand and gravel from said tubular members, said discharge outlet for solid material located adjacent the bottom of said bottom section and a gate valve adjacent a lower part of said tapered section.

16. The device set forth in claim 13 further characterized in that said housing includes an upper cover located above said tubular members and said mixture inlet is located adjacent the top of said cover whereby said mixture is introduced into said cover for flooding over said tubular members.

17. The device as set forth in claim 13 further characterized in that said device is mounted on wheels for transport over the ground.

18. The dewatering device set forth in claim 13 further characterized in that said horizontal floor has means for removably supporting said tubular members therein and permitting solid material to pass through said tubular members and through said horizontal floor.

19. A dewatering device for separating water from sand and gravel or the like, said device including an enclosing housing, a series of vertically disposed tubular members in said housing and having upper ends connected together by means of an upper generally horizontal wall, said housing including an upper cover located above said tubular members, a solids and water mixture inlet located adjacent the top of said cover whereby said mixture is introduced into said cover for flooding over said horizontal wall and into said tubular members, each of said tubular members having a series of small horizontally disposed slits therein, a lower generally horizontal floor in said housing and around the lower end of said tubular members and connecting the latter, said housing also including a downwardly and convergingly tapering bottom section located beneath said tubular members and said floor for receiving sand and gravel from said tubular members, a discharge outlet adjacent the bottom of said bottom section for solid material which is collected adjacent the bottom of said bottom section, and means to divert a portion of water which has been discharged through said slits to gravity flush solid material through said discharge outlet, and a gate valve adjacent a lower part of said bottom section, said floor receiving water that has been discharged through said slits in said tubular members, said horizontal floor having means for removably supporting said tubular members therein, and a water outlet in said housing for conducting said water from said housing after said water has passed through said slits.

* * * * *